US010053549B2

(12) United States Patent
Annan et al.

(10) Patent No.: US 10,053,549 B2
(45) Date of Patent: Aug. 21, 2018

(54) ORGANIC INFRARED ATTENUATION AGENTS

(75) Inventors: Nikoi Annan, Newark, OH (US); Yadollah Delaviz, Lewis Center, OH (US); Xiangmin Han, Stow, OH (US); Roland Loh, Stow, OH (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 365 days.

(21) Appl. No.: 13/531,643

(22) Filed: Jun. 25, 2012

(65) Prior Publication Data

US 2013/0040122 A1 Feb. 14, 2013

Related U.S. Application Data

(60) Provisional application No. 61/501,455, filed on Jun. 27, 2011.

(51) Int. Cl.
C08J 9/00 (2006.01)

(52) U.S. Cl.
CPC ........... *C08J 9/0023* (2013.01); *C08J 9/0061* (2013.01); *C08J 2201/03* (2013.01); *C08J 2325/06* (2013.01); *C08J 2400/30* (2013.01); *C08J 2401/02* (2013.01); *C08J 2403/02* (2013.01); *C08J 2467/02* (2013.01); *C08J 2471/02* (2013.01); *C08J 2495/00* (2013.01)

(58) Field of Classification Search
CPC .................................. B32B 5/18; C08L 25/06
USPC .......................... 428/212, 220; 521/138, 146
See application file for complete search history.

(56) References Cited

U.S. PATENT DOCUMENTS

| 3,557,840 | A | * | 1/1971 | Maybee | .................. 138/149 |
| 4,581,384 | A | * | 4/1986 | Marion | .................. C08G 18/68 |
| | | | | | 521/110 |
| 4,647,593 | A | | 3/1987 | Bartoskiak et al. | |
| 4,776,142 | A | | 10/1988 | Hardesty | |
| 5,373,026 | A | * | 12/1994 | Bartz | .................. C08J 9/0066 |
| | | | | | 427/373 |

(Continued)

FOREIGN PATENT DOCUMENTS

| EP | 658601 | 6/1995 |
| JP | 8-198997 | 8/1996 |

(Continued)

OTHER PUBLICATIONS www.newdruginfo.com/pharmacopeia/usp28/v28230/usp28nf23s0_m66430.htm, vol. No. 29, p. 1313.*

(Continued)

*Primary Examiner* — Lawrence Ferguson
(74) *Attorney, Agent, or Firm* — Calfee, Halter & Griswold LLP

(57) ABSTRACT

Organic infrared attenuation agents have been developed to improve the thermal insulation properties of polymeric foams such as polystyrene low density foams. The organic infrared attenuation agents can include polyols such as sorbitol, maltitol, and poly(ethylene glycol), polysaccharides such as starch or cellulose, and infrared attenuation polyesters such as polybutylene terephthalate. The organic attenuation agents include aromatic compounds or carbon oxygen bonds that are effective in absorbing infrared radiation at the desired wavelengths.

14 Claims, 2 Drawing Sheets

(56) References Cited

U.S. PATENT DOCUMENTS

| | | | |
|---|---|---|---|
| 5,532,284 A * | 7/1996 | Bartlett et al. | 521/134 |
| 5,679,718 A | 10/1997 | Suh et al. | |
| 5,698,606 A | 12/1997 | DeVos et al. | |
| 5,710,186 A | 1/1998 | Chaudhary | |
| 5,776,389 A | 7/1998 | Chaudhary | |
| 5,854,295 A | 12/1998 | Suh et al. | |
| 5,858,501 A | 1/1999 | Malone | |
| 5,863,960 A | 1/1999 | Shmidt et al. | |
| 5,869,544 A | 2/1999 | Shmidt et al. | |
| 5,962,545 A | 10/1999 | Chaudhary et al. | |
| 5,977,197 A | 11/1999 | Malone | |
| 5,993,707 A | 11/1999 | Chaudhary et al. | |
| 6,225,364 B1 | 5/2001 | Chaudhary et al. | |
| 6,350,789 B1 | 2/2002 | Miller et al. | |
| 6,355,341 B1 | 3/2002 | Chaudhary et al. | |
| 6,369,121 B1 | 4/2002 | Catalfamo et al. | |
| 6,632,382 B1 | 10/2003 | Miller et al. | |
| 6,838,146 B2 | 1/2005 | Merrill et al. | |
| 6,908,950 B2 | 6/2005 | Loh et al. | |
| 6,958,365 B2 | 10/2005 | Dontula et al. | |
| 7,005,457 B2 | 2/2006 | Loh et al. | |
| 7,166,646 B2 | 1/2007 | Loh et al. | |
| 7,214,739 B2 | 5/2007 | Kannan et al. | |
| 7,605,188 B2 | 10/2009 | Loh et al. | |
| 2002/0155270 A1 | 10/2002 | Chaudhary et al. | |
| 2003/0068485 A1 | 4/2003 | Ramsey | |
| 2003/0158330 A1 * | 8/2003 | L'Alloret | 524/801 |
| 2003/0225172 A1 | 12/2003 | Miller et al. | |
| 2004/0097607 A1 * | 5/2004 | Fujita et al. | 521/82 |
| 2004/0115420 A1 * | 6/2004 | Schoemann | 428/317.9 |
| 2004/0229966 A1 | 11/2004 | Dontula et al. | |
| 2005/0004285 A1 | 1/2005 | Delabroye et al. | |
| 2005/0176836 A1 | 8/2005 | Dontula et al. | |
| 2005/0192368 A1 | 9/2005 | Miller et al. | |
| 2005/0239975 A1 | 10/2005 | Gan et al. | |
| 2006/0106135 A1 | 5/2006 | Gan et al. | |
| 2007/0142487 A1 | 6/2007 | Miller et al. | |
| 2007/0179205 A1 | 8/2007 | Loh et al. | |
| 2007/0179206 A1 | 8/2007 | Miller et al. | |
| 2007/0213418 A1 | 9/2007 | Vermilion et al. | |
| 2008/0139682 A1 | 6/2008 | Vo et al. | |
| 2008/0242752 A1 * | 10/2008 | Delaviz et al. | 521/79 |
| 2008/0281012 A1 | 11/2008 | Van Horn | |
| 2008/0287560 A1 | 11/2008 | Loh et al. | |
| 2009/0054541 A9 | 2/2009 | Miller et al. | |
| 2009/0096120 A1 | 4/2009 | Subramonian et al. | |
| 2009/0117358 A1 | 5/2009 | Kruper, Jr. et al. | |
| 2009/0126332 A1 | 5/2009 | Boissonnat et al. | |
| 2009/0149561 A1 | 6/2009 | Worku et al. | |
| 2009/0197983 A1 | 8/2009 | Vo et al. | |
| 2009/0309075 A1 * | 12/2009 | Roder | C08K 5/0091 252/519.21 |
| 2009/0320397 A1 | 12/2009 | Hansbro et al. | |
| 2010/0028668 A1 | 2/2010 | Janda et al. | |
| 2010/0087555 A1 | 4/2010 | Vo et al. | |
| 2010/0099782 A1 | 4/2010 | Lee et al. | |
| 2010/0099783 A1 | 4/2010 | Vo et al. | |
| 2010/0105789 A1 | 4/2010 | Van Horn et al. | |
| 2010/0112328 A1 | 5/2010 | Van Horn et al. | |
| 2010/0113629 A1 | 5/2010 | Van Horn et al. | |
| 2010/0148110 A1 | 6/2010 | Casalini et al. | |
| 2010/0179236 A1 | 7/2010 | Bosnyak et al. | |
| 2010/0181524 A1 | 7/2010 | Elsheikh et al. | |
| 2010/0292355 A1 | 11/2010 | Barger et al. | |
| 2010/0304075 A1 | 12/2010 | Petela et al. | |
| 2011/0144221 A1 | 6/2011 | Delaviz et al. | |

FOREIGN PATENT DOCUMENTS

| | | |
|---|---|---|
| WO | 00/043446 | 7/2000 |
| WO | 09/148445 | 12/2009 |
| WO | 10/051163 | 5/2010 |
| WO | 10/093524 | 8/2010 |
| WO | 10/101747 | 9/2010 |
| WO | 10/111106 | 9/2010 |
| WO | 10/141400 | 12/2010 |

OTHER PUBLICATIONS

International Search Report from PCT/US12/43935 dated Sep. 14, 2012.

Glicksman et al., "Means to Improve the Thermal Conductivity of Foam Insulation", J. of Cellular Plastics, vol. 28, pp. 571-583, Nov. 1992.

Schuetz, et al., "A Basic Study of Heat Transfer Through Foam Insulation", J. of Cellular Plastics, pp. 114-121, vol. 20, No. 2, Mar.-Apr. 1984.

Office action from Chinese Application No. 201280032410.3 dated Oct. 29, 2014.

Office action from Chinese Application No. 201280032410.3 dated Mar. 22, 2016.

Office action from Chinese Application No. 201280032410.3 dated Sep. 8, 2015.

Office action from Chinese Application No. 201280032410.3 dated Sep. 5, 2016.

Office action from Mexican Application No. 13/15279 dated Jan. 23, 2017.

Notification from Chinese Application No. 201280032410.3 dated Sep. 5, 2016.

Office action from Mexican Application No. 13/15279 dated Jul. 4, 2017.

* cited by examiner

ORGANIC INFRARED ATTENUATION AGENTS

This application is related to and claims priority benefits from U.S. Provisional Patent Application Ser. No. 61/501,455, entitled "Organic Infrared Attenuation Agents," filed Jun. 27, 2011, the entire content of which is expressly incorporated herein by reference.

BACKGROUND

In response to environmental concerns, there has been an evolution from using freon and hydrochlorofluorocarbon foam blowing agents to hydrofluorocarbons, and eventually to carbon dioxide and/or hydrocarbons and alcohols. Unfortunately, as a result of this change, the thermal conductivity of foam material has increased due to the higher conductivity of these new blowing agents. This will result in insulation foams that no longer satisfy required product specifications unless additional steps are taken to increase the thermal resistance of these insulation foams.

It is known that the overall heat transfer in a typical foam block can be separated into three components: thermal conduction from gas (or blowing agent vapor), thermal conduction from polymer solids (including foam cell wall and strut), and thermal radiation across the foam block. Schutz and Glicksman, J. Cellular Plastics, March-April, 114-121 (1984). Of these three components, thermal radiation provides about one quarter of the overall heat transfer. Once the blowing agent and the polymer matrix are selected, it is difficult to affect the first two thermal conduction components, although they are important, occupying about 60% and 15% respectively to the overall heat transfer. Gas convection within the cells is negligible due to the small cell sizes present in typical insulating foam.

Heat radiation through polymeric foam materials is mainly in the format of infrared light. When a bundle of infrared light strikes the surface of an object, one part is reflected back into the environment, another part is absorbed by the object that is eventually transformed into heat or re-emitted back to the environment, and the rest is transmitted through the object. The infrared radiation emitted by an object is a function of its temperature. The wavelength of its peak intensity follows Wien's law, where the product of peak value wavelength and absolute temperature are held constant. As the temperature range of interest for plastic foams is around room temperature (i.e., 25° C.), this results in a peak intensity of infrared radiation of about 1000 $cm^{-1}$.

An infrared attenuation agent ("IAA") can be used to improve an insulating foam. An effective IAA favors increased reflection and absorption and decreased transmission of heat radiation as much as possible. Traditionally, flake-like inorganic materials have been used as the IAAs to reduce the portion of heat radiation. These include, for example, graphite, aluminum, stainless steel, cobalt, nickel, carbon black, and titanium dioxide. See Glicksman et al., J. Cellular Plastics, 28, 571-583 (1992). In commonly-assigned U.S. Pat. No. 7,605,188, the entire disclosure of which is incorporated herein by reference, surface-modified nano-graphite particulates that function as effective IAAs in polymer foams are described.

Unfortunately, one drawback of these inorganic materials is their incompatibility with relatively non-polar materials such as polystyrene. A relatively high weight percentage of these inorganic materials must also be used to achieve the required thermal resistance in the final insulating product. Because there is a limit to the amount of inorganic material that can be dispersed in a polymer foam, one cannot simply add higher amounts to provide the needed thermal resistance. Inorganic materials also tend to function as effective nucleation agents for polymeric foams, result in smaller cell size and higher foam density, which may be undesirable. There is therefore a need for infrared attenuation agents for use in insulating polymer foams that avoid these various processing difficulties while providing insulating foam having sufficient levels of thermal resistance.

SUMMARY

The inventors have developed organic materials suitable for use as infrared attenuation agents for polymeric foams. Organic materials show better compatibility and dispersability with polystyrene, resulting in fewer process issues during preparation of the foam. The better compatibility also tends to provide more uniform and larger cell sizes. Higher average cell sizes help to reduce foam board density which decreases industrial production cost. In some embodiments, the organic infrared attenuation agents are obtained from inexpensive recycled materials such as recycled paint or paper.

In accordance with the present disclosure, it has been found that certain oxygen-containing organic chemicals can serve as effective infrared attenuation agents (IAA). Accordingly, in one aspect, the current disclosure provides an insulating polymer foam that includes a) a foamed polymer prepared from a polymer using a blowing agent and b) an organic infrared attenuation agent. In some embodiments, the polymer is an alkenyl aromatic polymer, such as polystyrene. In some embodiments, the polymer foam has a cell size greater than 150 microns.

The organic infrared attenuation agents include carbon-oxygen bonds such as those found in alcohols, esters, and ethers. In some embodiments, these functional groups provide an organic infrared attenuation agent that has a peak absorption from about 700 $cm^{-1}$ to about 1300 $cm^{-1}$. In some embodiments, the infrared attenuation agent comprises from about 0.5 wt % to 20 wt % of the polymer foam.

A variety of organic material provide suitable IAAs. In one embodiment, the organic infrared attenuation agent is a polyol. For example, the polyol can be a sugar alcohol such as a sorbitol or maltitol. In another embodiment, the polyol is a polymeric polyol. For example, the polymeric polyol can be polyethylene glycol. In a further embodiment, the organic infrared attenuation agent is a carbohydrate, such as a polysaccharide. Particular polysaccharides include starch or cellulose polysaccharide such as pea starch or reclaimed cellulose. In yet another embodiment, the organic infrared attenuation agent is a recycled paint including an infrared attenuation polyester. For example, the infrared attenuation polyester can be polybutylene terephthalate or a polyester prepared from isophthalic acid and neopentyl glycol. In another embodiment, the infrared attenuation agent is coal tar pitch.

In another aspect, the present disclosure provides a rigid foam insulating board made from a foamed polymer including an organic infrared attenuation agent. In some embodiments, the board has a thickness of between about ⅛ inch to about 10 inches.

In yet another aspect, the present disclosure provides a method of preparing an insulating polymer foam having increased thermal resistance that includes the steps of adding an organic infrared attenuation agent to a polymer of polymer melt, melting the polymer to final a polymer melt, and extruding the polymer melt to form an insulating polymer foam.

BRIEF DESCRIPTION OF THE FIGURES

The present disclosure may be more readily understood by reference to the following figures, wherein.

DETAILED DESCRIPTION

Figure 1:
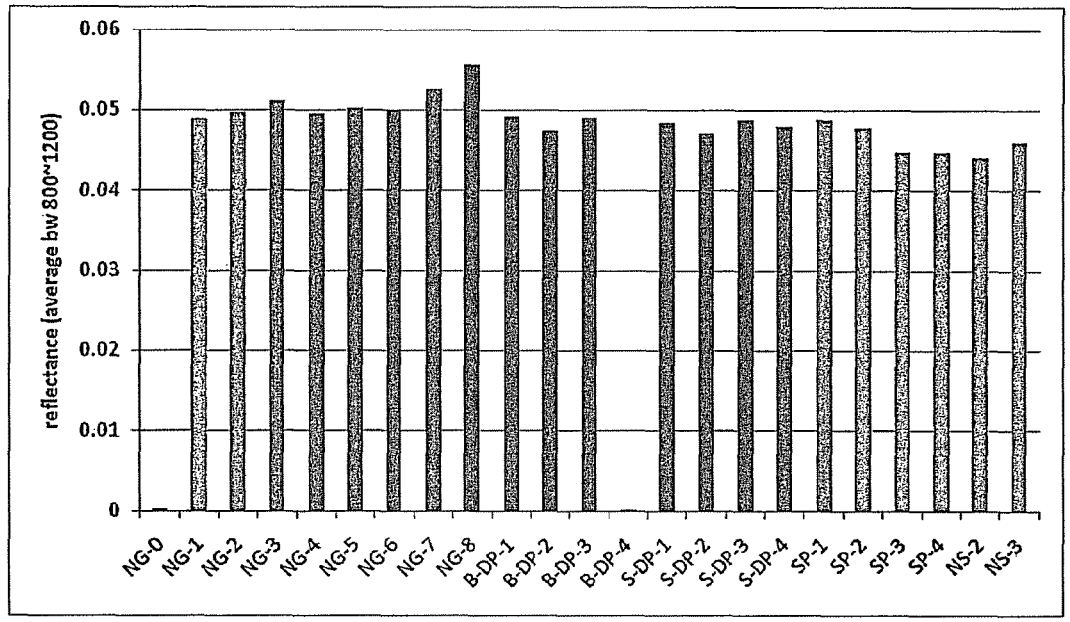
FIG. 1 provides a bar graph showing the IR reflectance of PS/IAAs solid disks compared with PS/nano-graphite.

The following discussion is presented to enable a person skilled in the art to make and use the present disclosure. Various modifications will be readily apparent to those skilled in the art, and the general principles disclosed herein may be applied to other embodiments and applications without departing from the scope of the present disclosure. Thus, the present disclosure is not intended to be limited to the embodiments shown, but is to be accorded the widest scope consistent with the principles and features disclosed herein.

Definitions

Unless otherwise defined, all technical and scientific terms used herein have the same meaning as commonly understood by one of ordinary skill in the art to which this disclosure pertains. In case of conflict, the present specification, including definitions, will control.

The terminology as set forth herein is for description of the embodiments only and should not be construed as limiting. Unless otherwise specified, "a," "an," "the," and "at least one" are used interchangeably. Furthermore, as used in the Detailed Description and the appended claims, the singular forms "a", "an", and "the" are inclusive of their plural forms, unless contraindicated by the context surrounding such.

Also herein, the recitations of numerical ranges by endpoints include all numbers subsumed within that range (e.g., 1 to 5 includes 1, 1.5, 2, 2.75, 3, 3.80, 4, 5, etc.).

Infrared Attenuation Agents

As described in commonly-assigned U.S. Pat. No. 7,605,188, the thermal conductivity of a polymer foam can be significantly reduced, and hence the insulating effect provided by the foam significantly increased, by including in the polymer forming the foam a suitable amount of an IAA. Typically, these materials are small particles-size particulates made from made various different materials including ceramics (e.g., titanium dioxide), naturally occurring inorganics (e.g., clay particles), metals (e.g., aluminum, gold, silver) and carbon-based materials (e.g., carbon black, graphite, expanded graphite, fibers made from carbon or graphite), etc.

A common problem associate with these materials is that, because they are particulate, they must have a suitably small particle size in order that they can be uniformly taken up by the polymer forming the foam during the foaming operation and hence uniformly distributed in the polymer foam ultimately obtained.

In accordance with this disclosure, this problem is essentially avoided by using certain oxygen-containing organic chemicals as the IAAs, it having been found that such compounds will also effect a substantial reduction in the thermal conductivity of the polymer foam so made, provided that these oxygen-containing organic chemicals are selected in a certain way.

Polymers Forming the Foams

Polymer foams using the organic IAAs of this disclosure can be made from any polymer suitable for making polymer foams. For example, they may be made from polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A particularly suitable class of thermoplastic polymers for making the polymer foams of this disclosure are alkenyl aromatic polymers. Examples of alkenyl aromatic polymers include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer.

Suitable alkenyl aromatic polymers include those derived from alkenyl aromatic compounds such as styrene, α-methylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. A particularly preferred alkenyl aromatic polymer comprises substantially (i.e., greater than about 95 percent) polystyrene, which polystyrene homopolymer being particularly preferred.

Normally, the polymers used to make the inventive foams will have a weight-average molecular weights of about 30,000 to about 500,000. Weight average molecular weights on the order of about 100,000 to 400,000 or even about 200,000 to 300,000, are more interesting.

Combining the Organic IAA with the Polymer

The organic IAAs of this disclosure can be combined with the polymer forming the inventive polymer foams in any conventional manner. An amount from about 0.5 to about 20% by weight of organic IAA can be included in the polymer, with amounts of 1 to 5% being more preferred.

For example, an in situ polymerization approach can be used in which the monomers forming the polymer are polymerized after first being combined with the organic IAAs of this disclosure. This approach is especially effective when the polymer forming the foam is made by addition polymerization of ethylenically unsaturated monomers, especially polymers and copolymers of styrene, methyl methacrylate, or a mixture of these and/or other ethylenically unsaturated monomers. Preferably, styrene monomer and an initiator (catalyst), such as benzoyl peroxide (BPO), or 2,2'-azobisisobutyronitrile (AIBN), are blended together completely using a conventional mixing apparatus such as a homogenizer. The organic IAA is then added to the monomer-initiator mixture in an amount of preferably about 0.1 to about 10%, more preferably about 0.5 to about 5% by weight based on the weight of the polymer. After mixing, the mixture is heated in an oven at a temperature of about 60 to 100° C., for about 15 to 30 hours for in-situ polymerization.

In mixing the organic IAA with the monomer, as discussed above, it is important to have uniform distribution of the organic IAA. Because of its organic character, the organic IAA of this disclosure is more compatible with, and hence more easily mixes uniformly with, the monomers and polymers fouling the foam relative to conventional particulate IAAs.

Another approach for combining the organic IAAs of this disclosure with the polymer forming the inventive polymer foams is physical blending. This approach is especially useful when these polymers have a relatively low melting or softening point. For example, the organic IAA may be blended with polymer carriers, such as polystyrene, polymethyl methacrylate (PMMA), ethyl methacrylate (EMA). The loading can be as high as 40%. Mixing temperature is about 150° C. to about 300° C., typically about 225° C. for EMA, and mixing time about 0 to about 3 minutes, typically less than one minute for EMA carrier containing 40 percent by weight of organic IAA, are crucial for effective dispersing the organic IAA throughout the polymer. Mixing may be conducted by any standard method know in the art. Preferably, the components are mixed using a Banbury mixer.

In either approach, additional conventional additives such as particulate infrared attenuation agents, plasticizers, flame retardant chemicals, pigments, elastomers, extrusion aids, antioxidants, fillers, antistatic agents, UV absorbers, citric acids, nucleating agents, surfactants, processing aids, etc., can be included in the polymer systems to be foamed in conventional amounts.

Forming the Polymer Foam

After in-situ polymerization or melt compounding, the organic IAA-containing polymer is foamed using a batch foaming process or standard extrusion process. For example, extruded polystyrene foams can be made by continuously extruding molten polystyrene containing a blowing agent under elevated temperature and pressure into ambient or vacuum conditions, allowing the mass to expand into a lightweight, closed-cell foam.

Standard extrusion processes and methods which may be used in the process of manufacturing embodiments of the present disclosure are described in commonly assigned U.S. Pat. No. 5,753,161 which is herein incorporated by reference in its entirety.

In the extrusion process, an extruded polymer foam containing the organic IAA is prepared by twin-screw extruders (low shear) with flat die and plate shaper. Alternatively, a single screw tandem extruder (high shear) with radial die and slinky shaper can be used. About 0.1 to about 10% of an organic IAA is then added into the extruder, preferably about 0.5 to 5% by weight, more preferably about 0.5 to about 3% by weight based on the weight of the polymer, a blowing agent, and optionally other additives. In a preferred embodiment, an extruded polymer foam is prepared by twin-screw extruders (low shear) with flat die and plate shaper. Alternatively, a single screw tandem extruder (high shear) with radial die and slinky shaper can be used. Preferably, the organic IAA is added into the extruder via multi-feeders, along with polystyrene, a blowing agent, and/or other additives.

The plastified resin mixture, containing the organic IAA, polymer, and optionally, other additives is heated to the melt mixing temperature and thoroughly mixed. The melt mixing temperature must be sufficient to plastify or melt the polymer. Therefore, the melt mixing temperature is at or above the glass transition temperature or melting point of the polymer. Preferably, in the preferred embodiment, the melt mix temperature is from about 200° C. to about 250° C., most preferably about 220° C. to about 240° C. depending on the amount of organic IAA.

A blowing agent is then incorporated to form a foamable gel. The foamable gel is then cooled to a die melt temperature. The die melt temperature is typically cooler than the melt mix temperature, in the preferred embodiment, from about 10° C. to about 130° C., and most preferably from about 120° C. The die pressure must be sufficient to prevent prefoaming of the foamable gel, which contains the blowing agent. Prefoaming involves the undesirable premature foaming of the foamable gel before extrusion into a region of reduced pressure. Accordingly, the die pressure varies depending upon the identity and amount of blowing agent in the foamable gel. Preferably, in the preferred embodiment, the pressure is from about 50 to about 80 bars, most preferably about 60 bars. The expansion ratio, foam thickness per die gap, is in the range of about 20 to about 70, typically about 60.

Any suitable blowing agent may be used in the practice on this disclosure. Blowing agents useful in the practice of this disclosure include inorganic agents, organic blowing agents, chemical blowing agents, and combinations thereof.

Suitable inorganic blowing agents include carbon dioxide, nitrogen, argon, water, air, nitrogen, helium, and combinations thereof. Organic blowing agents include aliphatic hydrocarbons having 1-9 carbon atoms, aliphatic alcohols having 1-3 carbon atoms, fully and partially halogenated aliphatic hydrocarbons having 1-4 carbon atoms, and combinations thereof. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include fluorocarbons, chlorocarbons, chlorofluorocarbons and cyclopentane. Examples of fluorocarbons include methyl fluoride, perfluoromethane, ethyl fluoride (HFC-161), ethyl fluoride, 1,1-difluoroethane (HFC-152a), 1,1,1-trifluoroethane (HFC-143a), 1,1,1,2-tetrafluoro-ethane (HFC-134a), 1,1,2,2-tetrafluoroethane (HFC-134), pentafluoroethane (HFC-125), difluoromethane (HFC-32), perfluoroethane, 2,2-difluoropropane (HFC-272fb), 1,1,1-trifluoropropane (HFC-263fb), perfluoropropane, 1,1,1,3,3-pentafluorobutane (HFC-365mfc), 1,1,1,3,3-pentafluoropropane (HFC 245fa), 1,1,1,2,3,3,3-heptafluoropropane (HFC-227ea), dichloropropane, difluoropropane, perfluorobutane, and perfluorocyclobutane. Partially halogenated chlorocarbons and chlorofluorocarbons for use in this disclosure include methyl chloride, methylene chloride, ethyl chloride-1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesutlfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide, trihydrazino triazine, and combinations thereof.

Low global warming hydrofluoro olefin (HFO) blowing agents have recently been developed, which are also suitable for use with the present disclosure. Examples of hydrofluoro olefin blowing agents include 2,3,3,3-tetrafluoropropene (HFO-1234yf); 1,1,1,4,4,4-hexafluoro-2-butene (FEA-1100) and trans-1,3,3,3-tetrafluoropropene (HFO-1234ze).

The amount of blowing agent used varies depending on the class of blowing agent used. For example, it is preferred to add about 0 to about 4% of ethanol or about 3 to about 6% of carbon dioxide. A preferred type of blowing agent for use in the present disclosure is fluorocarbons such as HFC-134a. In the present disclosure it is preferable to use about 4 to about 12%, or more preferably from about 6 to about 8% of HFC-134a. All percentages are based on the weight of the polymer.

Product Foams

The product foams of this disclosure are normally rigid, closed cell foams exhibiting a density of about 1.2 to about 5 pcf, more typically about 1.4 to about 3 pcf, and a thermal conductivity of about 0.1 to about 0.3 BTU·in/(hr·ft$^2$·° F.), 0.14 to about 0.25 BTU·in/(hr·ft$^2$·° F.), or about 0.2 to BTU·in/(hr·ft$^2$·° F.). Polymer foams including the organic IAAs of the present disclosure preferably provide at least 10% lower conductivity compared with polymer foams lacking an IAA. The polymeric foam can have a cell size ranging from 50 to 500 microns. However, cell sizes of 100 to 300 microns are preferred, with cell sizes greater than 150 microns being further preferred. The polymer foam can be formed into a variety of shapes. A preferred shape is an insulating foam board. Insulating polymer foam board can be about ⅛ to 12 inches thick, but is more typically about 1 to 4 inches thick.

In certain embodiments, the insulating polymer foam may have an R value in the range of 3 to 6° F.·ft$^2$·hr/BTU. In other embodiments, the insulating polymer foam may have an R value in the range of 4 to 5° F.·ft$^2$·hr/BTU. In certain embodiments, the insulating polymer foam may be comprised of no more than 10% by weight of a conventional inorganic infrared attenuation agent, wherein the conventional inorganic infrared attenuation agent is selected from the group consisting of graphite, aluminum, stainless steel, cobalt, nickel, carbon black, titanium dioxide, and combinations thereof. Furthermore, in certain embodiments, the insulating polymer foam having an R value in the range of 3 to 6° F.·ft$^2$·hr/BTU and comprised of an organic infrared attenuation agent may contain 0% by weight of a conventional inorganic infrared attenuation agent.

Organic Infrared Attenuation Agents

In accordance with this disclosure, organic compounds which contain at least one oxygen-carbon bond and preferably a plurality of oxygen-carbon bonds have been found to achieve a significant infrared attenuation effect in that they promote a substantial reduction in the thermal conductivities of polymer foams in which they are included. Preferably, the organic compounds have an oxygen to carbon molar ratio from about 1:1 to about 1:2, from about 1:1 to about 2:3, or most preferably about 1:1 The organic IAAs can be either high molecular weight polymers or low molecular weight additives. High molecular weight polymers generally have a molecular weight ranging from about 40,000 to 80 million Daltons, while low molecular weight additives generally have a molecular weight of 1000 Daltons or less.

Particular materials which have been found to be effective organic IAAs include polyols, polysaccharides, polyesters found in recycled paint, and coal tar pitch. All of these compounds or compositions were found to include compounds having infrared absorption characteristics suitable for an infrared attenuation agent. Aromatic compounds such as those found in coal tar pitch have a peak infrared absorption around 700 cm$^{-1}$, while the carbon-oxygen bonds found in alcohols, ethers, and esters have a peak infrared absorption from about 1000 to about 1300 cm$^{-1}$. Preferred peak absorptions are from about 1000 to about 1200 cm−1, which correspond to those provided by fluoralkanes.

Polyols typically include a large number of carbon-oxygen bonds, and therefore provide suitable organic attenuation agents. Polyols include both sugar alcohols and polymeric polyols. Sugar alcohols having a molecular weight from about 100 to about 500. Preferred sugar alcohols are monosaccharides or disaccharides includes from 6 to 12 carbon atoms. Examples of such sugar alcohols include mannitol, sorbitol, dulcitol, iditol, isomalt, maltitol, and lactitol.

Sorbitol and maltitol are preferred examples of 6 and 12 carbon atom sugar alcohols, respectively. Sorbitol has the following structure

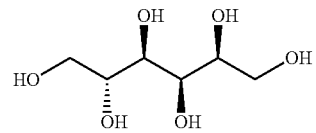 [SMILES: OC[C@@H](O)[C@@H](O)[C@H](O)[C@@H](O)CO]

and maltitol has the following structure:

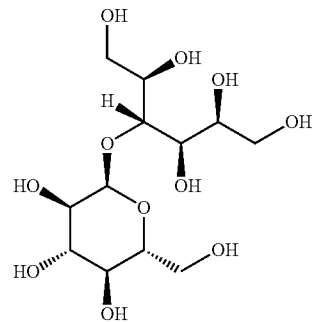 [SMILES: OC[C@@H](O)[C@@H](O[C@H]1O[C@H](CO)[C@@H](O)[C@H](O)[C@H]1O)[C@H](O)[C@@H](O)CO]

Polymeric polyols are another type of polyols suitable for use as organic attenuation agents. Polymeric polyols include polyethers formed from ether monomers having from 2 to 4 carbon atoms. Particular examples include polyethylene glycol (PEG) and polypropylene glycol. PEG has the following formula

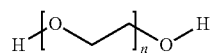

An example of a suitable polyethylene glycol is PEG 4,000 (code number: 81240-1KG) supplied by Sigma-Aldrich, St. Louis, Mo.

Another, class of useful organic IAAs are carbohydrates. Carbohydrates include monosaccharides, disaccharides, oligosaccharides, polysaccharides, starches, and relatively large hydrolysis products of starches such as maltodextrin. Polysaccharides can vary dramatically in terms of size and molecular weight. Examples of carbohydrates include monosaccharides and disaccharides such glucose, fructose, maltose, dextrose, and sucrose. Carbohydrates also include natural sources of saccharides and polysaccharides such as cellulose, levan, pullulan, corn syrup, molasses, honey; other cellulosics such as humic substances, etc. Specific examples of suitable polysaccharide organic IAAs are recycled cellulose from paper and pea starch, which contains ~35% amylose and ~65% amylopectin having the following structures:

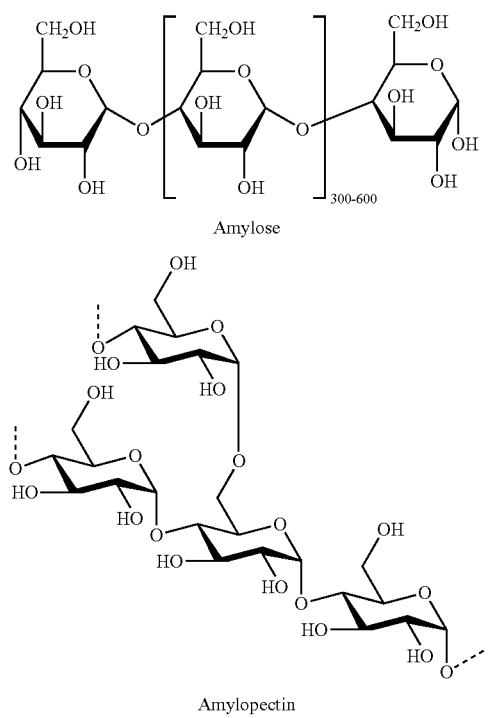

Recycled paint including an infrared attenuating polyester can also be used as an organic IAA. Recycled paint includes polyesters such as those made by the condensation of dicarboxylic acids and diols, especially isophthalic and terephthalic acid esters made with a variety of different polyols. Specific examples include polyethylene terephthalate, polybutylene terephthalate, polyethylene isophthalate and polybutylene isophthalate, and a polyester prepared from isophthalic acid and neopentyl glycol.

Another useful organic IAA is coal tar pitch, which includes a wide range of aromatic compounds providing suitable IR absorbances.

A preferred source of organic IAAs of this disclosure include recycled or reclaimed products, as such materials are usually readily available and fairly inexpensive. Particular examples of such recycled or reclaimed products include recycled paper available from Mid America Food Sales of St. Charles, Mo., which includes reclaimed cellulose having the following structure

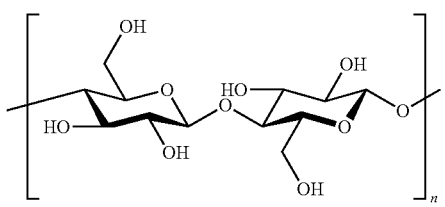

Additional particular examples of such recycled or reclaimed products include recycled paint. Recycled paints from the automobile or construction industries are an inexpensive source of organic IAAs. Recycled paints can be provided in various forms, such as a solid powder or a "dehydrated putty" semisolid. Recycled paints include both organic resins and metal or metal oxide pigments, all of which can function together to provide an infrared attenuation capacity. One example of recycled paint includes silver color recycled paint powder available from Stolte Enterprises Inc. of Glen Ellyn, Ill. (IVC industrial coatings, PD-764 light gray hybrid, prod. 82318H32K), which contains polybutylene terephthalate and another polyester of isophthalic acid and neopentyl glycol.

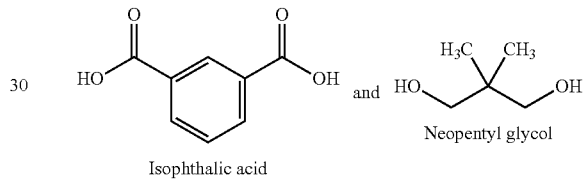

Another example of recycled paint useful as a source of IAA is brown color recycled paint powder, also available from Stolte Enterprises Inc (Morton 15-1001 corvel white gator epoxy Corvel® coating powder), which also contains these polyesters.

EXAMPLES

In order to more thoroughly describe embodiments of this disclosure, the following working examples are provided. Because nano-graphite has been proved to be a good IAA, as described in commonly-assigned U.S. Pat. No. 7,605,188, mentioned above, the inventive organic IAAs are compared with these particulate nano-graphite IAAs in the following working examples. The following examples are provided for illustrative purposes only and are in no way intended to limit the scope of the disclosure.

Example 1: Infrared Reflectance of Polystyrene Containing Organic IAAs

Four levels (0.5, 1, 2.5, & 5 wt %) of sorbitol, maltitol, silver color and brown color recycled paints were melt blended into polystyrene ("PS") in a twin screw extruder (Leistritz 27). The blended pallets were then molded into a round disk (⅛" thick and 2" in diameter) by using an injection molding machine (Cincinnati ROBOSHOT). Infrared ("IR") reflectance was polished and analyzed by reflectance infrared spectroscopy. The resulted intensity of IR reflectance was compared with those of otherwise identical polystyrene disks made with nano-graphite IAAs at nine levels (0, 0.05, 0.1, 0.2, 0.4, 0.8, 1.6, 3.2, & 6.4 wt %).

FIG. 1 shows the IR reflectance of the compounds from PS/nano-graphite and PS/organic IAAs. The intensity of IR reflectance from 700 to 1200 $cm^{-1}$ was averaged to help comparison because our preferred range for IR wavelength number is around 1000 $cm^{-1}$. The higher the value of the reflectance intensity, the more heat radiation is reflected back to the environment and therefore the more effective an IAA is.

Without nano-graphite, pure PS (NG-0) has nearly zero reflectance. With more nano-graphite added, the reflectance of PS/nano-graphite compounds exhibits higher reflectance. More interestingly, as shown in FIG. 1, the organic IAAs shows comparable reflectance as those of nano-graphite compounds, although the values are a little bit lower. The following Table 1 gives the description of sample codes in FIG. 1.

TABLE 1

Description of Samples in FIG. 1

| sample # | Description |
|---|---|
| NG-0 | PS (Nova 1600) |
| NG-1 | PS/0.05% nano-graphite |
| NG-2 | PS/0.1% nano-graphite |
| NG-3 | PS/0.2% nano-graphite |
| NG-4 | PS/0.4% nano-graphite |
| NG-5 | PS/0.8% nano-graphite |
| NG-6 | PS/1.6% nano-graphite |
| NG-7 | PS/3.2% nano-graphite |
| NG-8 | PS/6.4% nano-graphite |
| B-DP-1 | PS/0.5% brown dry paint powder |
| B-DP-2 | PS/1% brown dry paint powder |
| B-DP-3 | PS/2.5% brown dry paint powder |
| B-DP-4 | PS/5% brown dry paint powder |
| S-DP-1 | PS/0.5% silver dry paint powder |
| S-DP-2 | PS/1% silver dry paint powder |
| S-DP-3 | PS/2.5% silver dry paint powder |
| S-DP-4 | PS/5% silver dry paint powder |
| SP-1 | PS/0.5% SweetPearl - Maltitol P200 |
| SP-2 | PS/1% SweetPearl - Maltitol P200 |
| SP-3 | PS/2.5% SweetPearl - Maltitol P200 |
| SP-4 | PS/5% SweetPearl - Maltitol P200 |
| NS-2 | PS/1% Neosorb - Sorbitol P60W |
| NS-3 | PS/2.5% Neosorb - Sorbitol P60W |

Example 2: Infrared Transmission of Polystyrenes Containing Organic IAAs

By using thin films from the same group of samples listed in Table 1, transmission measurements were performed using infrared spectroscopy. The thin films were prepared by placing a small amount of each sample sandwiched between two microscope slides coated with a very thin film of silicone oil to release the samples from the glass slides. Two small binder clips were added and the assembly was heated in an oven at 460° F. for 5 minutes. The resulting thin films were allowed to cool, pealed from the glass slides and analyzed by infrared spectroscopy After eliminating the influence of thin film thickness, the transmittance of all samples was determined. Again, the transmittance was averaged between wavelength of 800 and 1200 $cm^{-1}$ for easy comparison.

Figure 2:
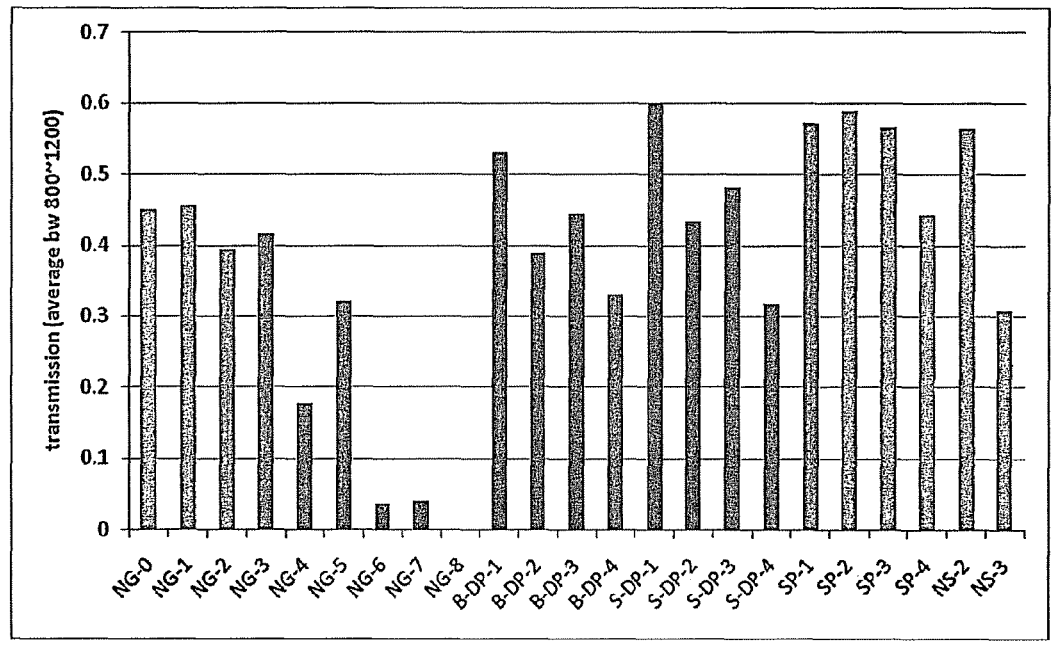
FIG. 2 provides a bar graph showing the IR transmittance of PS/IAAs thin films compared with PS/nano-graphite.

The results obtained are shown in FIG. 2, it being understood that lower transmittance numbers connote a better attenuation effect. As can be seen from this figure, transmittance decreases as concentration of either the nano-graphite or organic IAAs increases. 2.5% of sorbitol (NS-3), 5% brown color recycled paint (B-DP-4), and 5% silver color recycled paint (S-DP-4) have comparable transmittance as that of 0.8% nano-graphite (NG-4).

Example 3: R Values of Polystyrene Foams Made with Organic IAAs

Polystyrene (PS) foam boards 0.5 inch thick and 4" in width were made using the Leistritz 27 twin screw extruder and a specialized foaming die, the boards containing seven different organic IAAs. Each board contained 1 wt. % IAA, along with 5 wt. % of HFC-134a (1,1,1,2-tetrafluoroethane) and 2 wt. % water as blowing agents, as well as graphite as a nucleation agent. During foaming process, the die pressure was around 1000 psi and the die temperature was around 120° C. with an extrusion rate about 90 grams/min.

The thermal conductivities of each board was then measured on a testing apparatus from Laser Comp (Fox 200), based on which the R values were calculated and compared with the control sample without any organic IAA.

The detailed recipes of each board and the results obtained are listed in the following Table 2, while the results obtained are also graphically Illustrated in FIG. 3.

TABLE 2

R values of Polystyrene Foam Boards Containing Different Organic IAAs

| Formula | control | trial 1 | trial 2 | trial 3 | trial 4 | trial 5 | trial 6 | trial 7 |
|---|---|---|---|---|---|---|---|---|
| PS (%) | 100.0 | 100.0 | 100.0 | 100.0 | 100.0 | 100.0 | 100.0 | 100.0 |
| Nano-graphite (%) | 0.2 | 0.2 | 0.2 | 0.2 | 0.2 | 0.2 | 0.2 | 0.2 |
| sorbitol (%) | 0 | 1.0 | 0 | 0 | 0 | 0 | 0 | 0 |
| maltitol (%) | 0 | 0 | 1.0 | 0 | 0 | 0 | 0 | 0 |
| PEG (%) | 0 | 0 | 0 | 1.0 | 0 | 0 | 0 | 0 |
| cellulose (%) | 0 | 0 | 0 | 0 | 1.0 | 0 | 0 | 0 |
| pea starch (%) | 0 | 0 | 0 | 0 | 0 | 1.0 | 0 | 0 |
| Silver paint (%) | 0 | 0 | 0 | 0 | 0 | 0 | 1.0 | 0 |
| Brown paint (%) | 0 | 0 | 0 | 0 | 0 | 0 | 0 | 1.0 |
| HFC-134a (%) | 5.0 | 5.0 | 5.0 | 5.0 | 5.0 | 5.0 | 5.0 | 5.0 |
| Water (%) | 2.0 | 2.0 | 2.0 | 2.0 | 2.0 | 2.0 | 2.0 | 2.0 |
| Foam density (pcf) | 4.1 | 8.0 | 8.5 | 9.2 | 4.8 | 7.0 | 6.9 | 7.4 |
| R value | 4.3 | 4.2 | 3.8 | 3.5 | 4.3 | 4.8 | 4.2 | 4.0 |
| Predicted R value at the same density | 4.3 | 4.6 | 4.3 | 4.1 | 4.4 | 5.0 | 4.4 | 4.3 |

Figure 3:
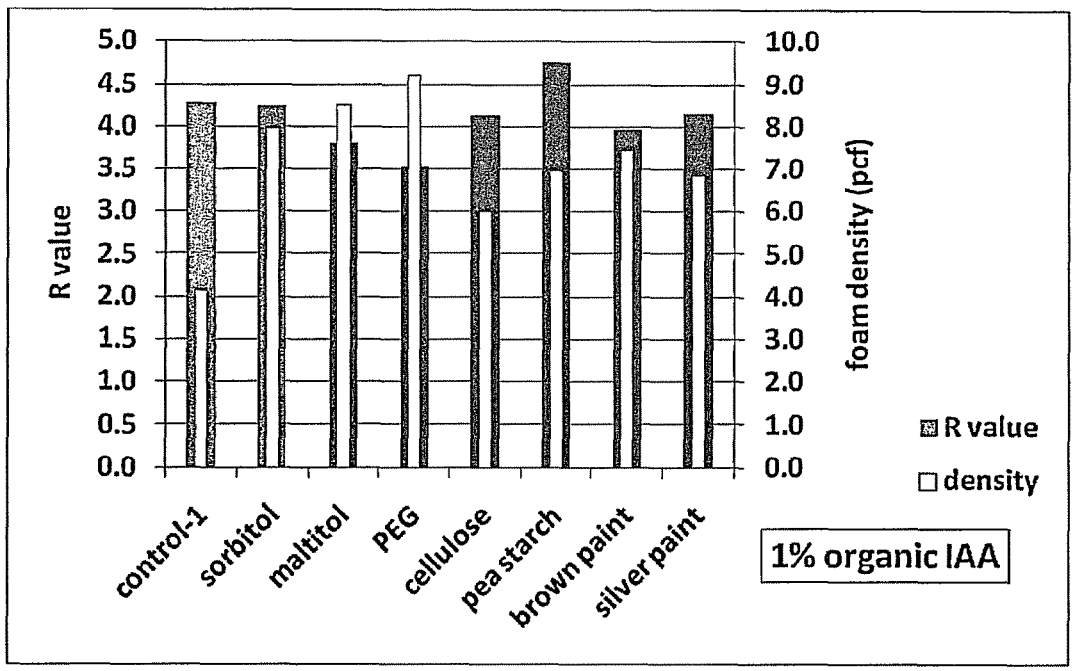
FIG. 3 provides a bar graph showing the density and R value of PS foams including various organic IAAs.

As shown in Table 2 and FIG. 3, pea starch shows the highest R value, being more than 10% greater than that of the control. This indicates that pea starch is an effective organic IAA to increase the R value and thus improve the thermal insulation property of these polystyrene foams.

Figure 4:
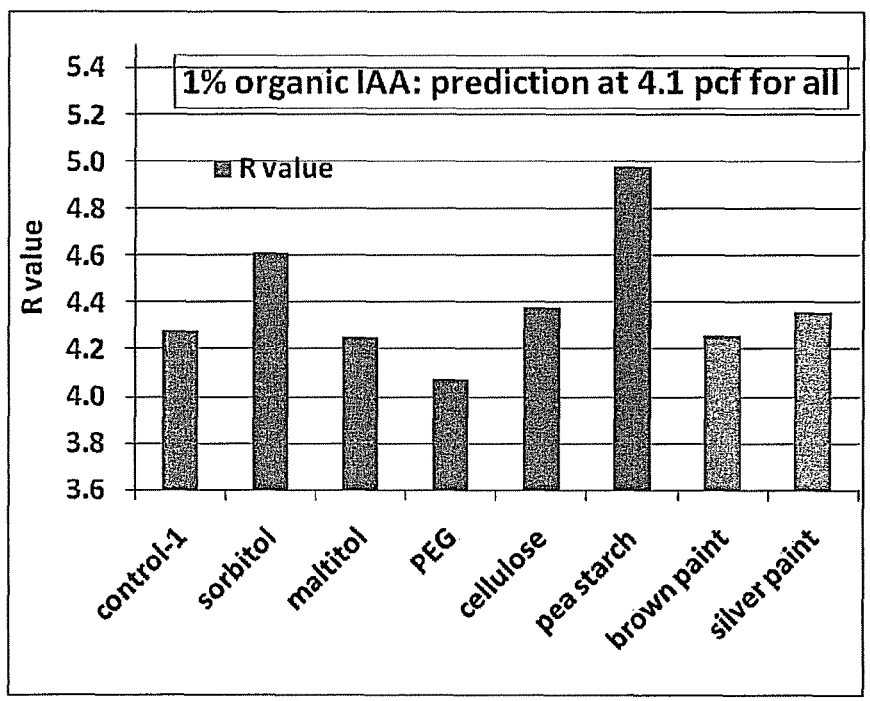
FIG. 4 provides a bar graph showing the predicted R value at same density for all PS/IAA samples.

It is a very well known that PS foams provide the highest R values when their densities are about 2 pounds per cubic foot ("pcf"). However, because a small scale extruder was used to obtain the results shown in Table 2, the sample foam had a density of about 4.1 pcf. By following the curve of R value versus density, the R value of all foam samples was extrapolated to density of 4.1 pcf and the resulted prediction are shown in FIG. 4. Again pea starch showed the highest R value. Sorbitol, cellulose, and silver color recycled paint that contains polyesters show potential as a good organic IAA, especially if a higher concentration is used.

The complete disclosure of all patents, patent applications, and publications, and electronically available materials cited herein are incorporated by reference. The foregoing detailed description and examples have been given for clarity of understanding only. No unnecessary limitations are to be understood therefrom. In particular, any theories of operation presented herein are optional and the inventors are therefore not bound by theories described herein.

What is claimed is:

1. An insulating polymer foam formed from a composition comprising:
   an alkenyl aromatic polymer material comprising greater than 95 wt. % polystyrene;
   a blowing agent comprising hydrofluoroolefins (HFOs);
   an organic infrared attenuation agent having a plurality of oxygen-carbon bonds and an oxygen to carbon molar ratio from 1:1 to 1:2, wherein the organic infrared attenuation agent comprises one or more of:
      a polyol selected from the group consisting of sorbitol, malitol, and poly(ethylene glycol),
      a carbohydrate,
      recycled paint, and
      coal tar pitch.

2. The insulating polymer foam of claim 1, wherein the organic infrared attenuation agent has a peak absorption from 700 to 1300 cm$^{-1}$.

3. The insulating polymer foam of claim 1, wherein the carbohydrate is a polysaccharide comprising pea starch or reclaimed cellulose.

4. The insulating polymer foam of claim 1, wherein the insulating polymer foam has a cell size greater than 150 microns.

5. The insulating polymer foam of claim 1, wherein the insulating polymer foam comprises from 0.5 to 20 wt % of the organic infrared attenuation agent.

6. A rigid foam insulating board comprising the insulating polymer foam of claim 1.

7. The rigid foam insulating board of claim 6, wherein the board has a thickness of ⅛ to 10 inches.

8. The insulating polymer foam of claim 1, wherein the insulating polymer foam has a cell size from 50 to 500 microns.

9. The insulating polymer foam of claim 1, wherein the insulating polymer foam comprises a closed cell structure.

10. The insulating polymer foam of claim 1, wherein the organic infrared attenuation agent has an oxygen to carbon molar ratio from 1:1 to 2:3.

11. The insulating polymer foam of claim 1, wherein the recycled paint comprises a polyester.

12. The insulating polymer foam of claim 11, wherein the polyester is polybutylene terephthalate or a polyester prepared from isophthalic acid and neopentyl glycol.

13. The insulating polymer foam of claim 1, wherein the insulating polymer foam is a thermoplastic foam.

14. The insulating polymer foam of claim 1, wherein the insulating polymer foam is a rigid foam.

* * * * *